3,319,218
ACOUSTIC BEAM FORMING SYSTEM
Arthur H. Zefting, Rochester, N.Y., assignor to General Dynamics Corporation, a corporation of Delaware
Filed June 28, 1965, Ser. No. 467,478
4 Claims. (Cl. 340—6)

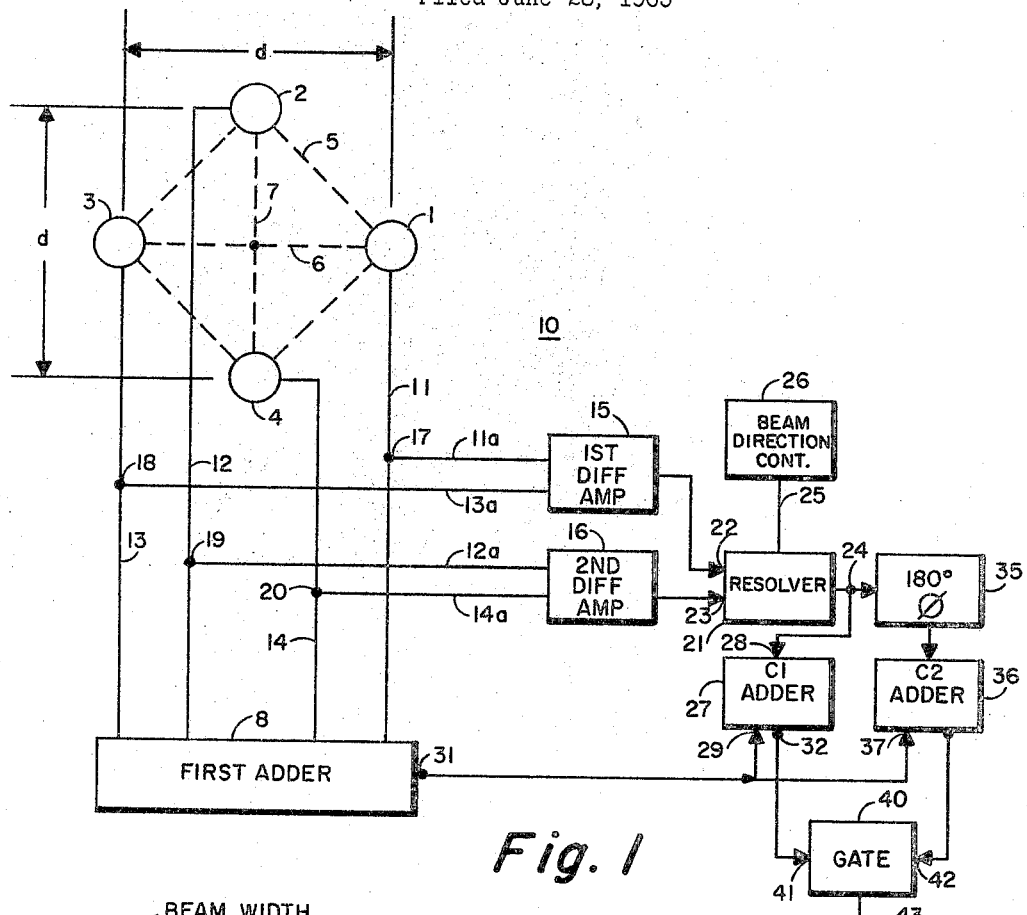
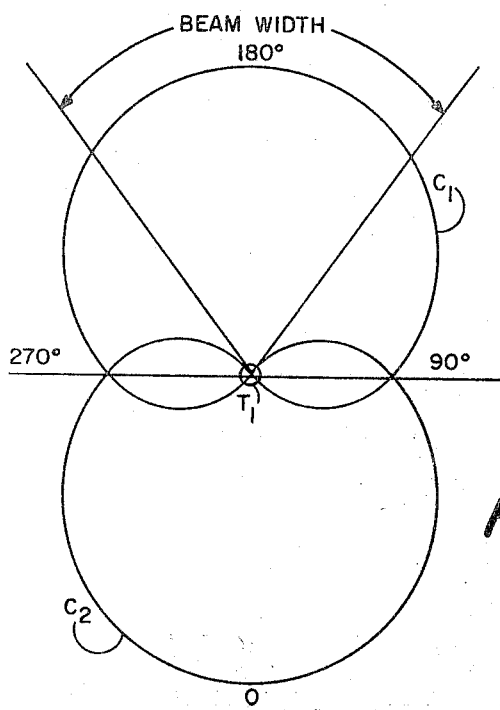
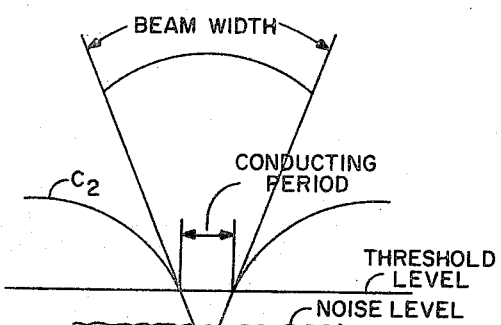
Fig. 1
Fig. 2
Fig. 3
INVENTOR.
ARTHUR H. ZEFTING
BY
Samuel R. Genco
ATTORNEY United States Patent Office 3,319,218
Patented May 9, 1967

The present invention relates to acoustic apparatus and more particularly to acoustic apparatus for forming an acoustic beam.

Although the present invention is suited for more general applications, it is particularly adapted for use in underwater acoustics wherein it is desirable to have a relatively narrow acoustic beam, such as a search light beam, which may be rotated. Acoustic beams are particularly advantageous for underwater detection of a sound source. One of the major problems of underwater detection is that of providing a relatively narrow acoustic beam which may be used in searching an area of interest.

Accordingly, it is an object of the present invention to provide an improved acoustic apparatus.

It is another object of the present invention to provide improved hydrophone apparatus which produces a relatively narrow acoustic beam suitable for underwater surveillance.

It is still another object of the present invention to provide an improved hydrophone apparatus which produces a three dimensional acoustic beam.

It is another object of the present invention to provide a small hydrophone array which forms a relatively narrow acoustic beam.

Briefly described, an acoustic apparatus, according to an embodiment of the present invention includes a hydrophone array, including four hydrophones, each supported at different corners of an imaginary square, having diagonals, the lengths of which are fractional parts of a given wavelength at a given operating frequency. Also included are cardioid generating means connected to the hydrophone array for generating two output signals, which respectively correspond to two cardioid patterns 180° out of phase with each other. Further included is a threshold gating means connected to the cardioid generating means for providing an output signal corresponding to a narrow beam pattern only when one of the two output signals is at a greater voltage level than the other. Means are also provided for selectively rotating the two cardioid patterns to thereby rotate the beam pattern resulting from the two output signals.

The invention itself, both as to its operation and method of operation, as well as additional objects and advantages thereto, will become more readily apparent from a reading of the following description in connection with the accompanying drawings in which:

FIG. 1 is a simplified block diagram of an acoustic system, including four hydrophones, which is illustrative of one embodiment of the invention;

FIG. 2 is a chart showing two cardioid patterns 180° out of phase with each other, and FIG. 3 is another chart showing a beam pattern which is useful in explaining the mode of operation of the acoustic apparatus.

Referring to FIG. 1 there is shown an acoustic apparatus 10 for forming a relatively narrow acoustic beam in accordance with the invention. The acoustic apparatus 10 includes first, second, third and fourth pressure gradient transducers or hydrophones 1, 2, 3 and 4 respectively, in a hydrophone array mounted on a suitable supporting structure generically represented by a dotted outline of an imaginary square 5. The supporting structure 5 may be, for example, a sonobuoy which supports the four hydrophones 1, 2, 3 and 4 in a horizontal plane when floated in water. The four hydrophones 1, 2, 3 and 4 are disposed at different corners of the imaginary square 5 and are spaced a fractional part $d$ of a given wavelength $\lambda$ of an operating frequency along the diagonals 6 and 7 of the imaginary square 5. The fractional part $d$ may be, for example, a quarter wavelength ($\lambda/4$) of the operating frequency. The operating frequency of the acoustic apparatus 10 may be in the audio or low frequency range and may be, for example, in a range of 1 to 10 kc.

The acoustic apparatus 10 is operative at other fractional parts $d$ of a given wavelength and operating frequencies, so that the above spacing and operating frequency should not be taken as limiting. The first and third hydrophones 1 and 3 are disposed at the ends of the diagonal 6, while the second and fourth hydrophones 2 and 4 are disposed at the ends of the diagonal 7 of the imaginary square 5.

The sonobuoy or supporting imaginary square 5 and one of the first, second, third and fourth hydrophones 1, 2, 3 and 4 respectively, may be oriented with respect to the magnetic north by fixing and aligning one of the four hydrophones 1, 2, 3 and 4 with a north seeking device such as a permanent bar magnet not shown. Accordingly, the remaining hydrophones are relatively oriented in the west, south and east quadrants respectively. Other orientation means may be used without departing from the invention.

The first, second, third and fourth hydrophones 1, 2, 3 and 4 are evenly matched and have substantially the same omnidirectional characteristics and sensitivities. The first, second, third and fourth hydrophones 1, 2, 3 and 4 have electrical audio outputs $A_1$, $A_2$, $A_3$ and $A_4$, which are applied by way of conductors 11, 12, 13 and 14 respectively, to a first adder 8, which may be for example, a transformer.

The first adder 8 sums the electrical outputs $A_1$, $A_2$, $A_3$ and $A_4$ of the first, second, third and fourth hydrophones 1, 2, 3 and 4 respectively, to derive an alternating electrical current reference signal, an oscilloscope trace of which describes a slightly irregular circle. The reference signal appears to emanate from an imaginary or virtual hydrophone located at the point of intersection of the diagonals 6 and 7 of the imaginary square 5.

The acoustic apparatus 10 further includes first and second difference amplifiers 15 and 16. The electrical outputs $A_1$ and $A_3$ from the first and third hydrophones 1 and 3 respectively are applied to the first difference amplifier 30 by way of conductors 11 and 13 and conductors 11a and 13a which are connected to conductors 11 and 13 respectively at junctions 17 and 18. The electrical output $B_1$ from the first difference amplifier 30 is equal to the difference between the electrical outputs $A_1$ and $A_3$ of the first and third hydrophones 1 and 3 respectively. The first difference amplifier 15 algebraically subtracts the electrical output $A_3$ of the third hydrophone 3 from the electrical output $A_1$ of the first hydrophone 1. This may be expressed algebraically as $(A_1-A_3)$ is equal to $B_1$.

The electrical outputs $A_2$ and $A_4$ on the second and fourth hydrophones 2 and 4 respectively are applied to the second difference amplifier 30 by way of conductors 12 and 14 and conductors 12a and 14a respectively which are connected at junctions 19 and 20 respectively. The second difference amplifier 16 has an electrical output $B_2$ which is equal to the difference between the electrical outputs $A_2$ and $A_4$ of the second and fourth hydrophones 2 and 4 respectively.

The acoustic apparatus 10 also includes a phase shifting resolver 21 having input terminals 22 and 23 connected to the first and second difference amplifiers 15 and 16 respectively. The phsae shifting resolver 21 includes an output terminal 24 and a rotor shaft 25. The phase shifting resolver 21 may be, for example, of the type which includes two identically wound stator coils at right angles to one another in such a way that they act as a primary coil in a transformer in which the secondary is a rotor. The two stator coils and the rotor of the phase shifting resolver are not shown in FIG. 1. The two stator coils are connected to the input terminals 22 and 23. The rotor of the resolver 21 has an output terminal at 24. The rotor of the phase shifting resolver 21 may be rotated by a beam direction controller 26 connected to the rotor shaft 25. The beam direction controller 26 may be a synchronous driver for rotating the shaft 25 at a constant speed, or it may be a servo mechanism which may rotate the shaft selectively. Manual control may also be employed for selectively rotating the shift 25.

The phase shifting resolver 21 derives a phase shifted voltage from the electrical input voltage $B_1$ and $B_2$ from the first and second difference amplifiers 15 and 16. The electrical input voltages $B_1$ and $B_2$ applied to the phase shifting resolver 21 are combined to derive the phase shifted voltage which may be phase shifted from 0 to 360° selectively.

The phase shifted voltage output from the resolver 21 is applied from terminal 24 of the resolver 21 to a terminal 28 of a $C_1$ adder 27, which also includes an input terminal 29 connected to an output terminal 31 of the first adder 8. The output of the $C_1$ adder 27 is a combined signal from the first adder 8 and the resolver 21, which combined signal represents a cardioid pattern $C_1$ as viewed from the center of the array, as shown in FIG. 2.

The output of the resolver 21 is also applied from terminal 24 to a 180° phase shifter 35 which phase shifts the output of the resolver 21 by 180° and applies the phase shifted output to a $C_2$ adder 36, which is connected to the first adder 8 at input terminal 37. The $C_2$ adder 36 combines the 180° phase shifted output from the 180° phase shifter 35 and the output of the first adder 8 to derive a second output signal, which represents a cardoid pattern $C_2$ which is 180° out of phase with the first cardioid patter $C_1$, as shown in FIG. 2, when viewed from the center of the array.

The first and second outputs of the $C_1$ adder 27 and the $C_2$ adder 36 are applied to a threshold gate 40 at input terminals 41 and 42 respectively. The threshold gate 40 has an output terminal at 43. The threshold gate 40 has an output signal only when the output voltage $C_1$ adder 27 exceeds the output voltage of the $C_2$ adder 36. The output of the threshold gate 40 is thus always at a maximum when the output of the $C_1$ adder 27 exceeds the output voltage of the $C_2$ adder 36. Stated in another way, the threshold gate 40 has an ouput at terminal 43 when the output of the $C_1$ adder 27 exceeds a given threshold level.

The operation of the acoustic apparatus 10 will be described with the aid of FIGS. 2 and 3 which show the relationship of the cardoid patterns $C_1$ and $C_2$ adders 27 and 36 respectively, to form a three directional beam having a beam width or cross sectional areas as illustrated in FIGS. 2 and 3. In the operation of the acoustic apparatus 10, acoustic energy received by the first, second, third and fourth hydrophones, 1, 2, 3 and 4 is converted to electrical signals $A_1$, $A_2$, $A_3$ and $A_4$. The electrical signals $A_1$, $A_2$, $A_3$ and $A_4$ are applied to the first adder 8 by way of conductors 11, 12, 13 and 14. The first adder 8 integrates or sums the electrical signals $A_1$, $A_2$, $A_3$ and $A_4$ to derive an A.C. signal which appears to emanate from the virtual or imaginary hydrophone located at the intersection of the diaognals 6 and 7 of the imaginary square. A time trace of the A.C. output signal of the first adder 8 at terminal 31 is a slightly irregular circle, as previously described.

The electrical signals $A_1$ and $A_3$ of the first and third hydrophones 1 and 3 are applied to the first difference amplifier 15, which subtracts the electrical signal $A_3$ of the third hydrophone 3 from the electrical signal $A_1$ of the first hydrophone 1 to derive an alternating current signal voltage having one given phase. The signal voltage $B_1$ from the first difference amplifier 15 is applied to the resolver 21 at terminal 22. In a like manner, the signals $A_2$ and $A_4$ of the second and fourth hydrophones 2 and 4 respectively are applied to the second difference amplifier 16 to derive an alternating current output signal of another given phase with respect to said one given phase which is applied to the resolver 21 at terminal 23.

The phase shifting resolver 21 derives an alternating current output voltage at terminal 24 which is phase shifted by an amount proportional to the rotation of the rotor shaft 25. The rotor of the resolver 21 gives one degree (electrical) of phase shift for one degree (mechanical) of rotation. The shaft 25 of the resolver 21 may be rotated manually or by a servo mechanism as previously described. The phase shifted output voltage of the resolver 21 causes the cardioid patterns $C_1$ and $C_2$, shown in FIG. 2, to rotate, as will be described hereinafter.

The A.C. electrical output of the resolver 21 is applied to the $C_1$ adder 27 wherein it is combined with the A.C. signal of the first adder 8 to derive an A.C. signal voltage at terminal 32. The A.C. signal at terminal 32 may be traced against time to define a first cardioid pattern $C_1$ as shown in FIG. 2.

Another cardioid pattern 180° out of phase with the first cardioid pattern $C_2$ is traced from the $C_2$ adder 36. The $C_2$ adder 36 combines the A.C. signal from the first adder 8 with a 180° phase shifted voltage from the terminal 24 of the resolver 21. The second cardioid pattern $C_2$ is considered as the controlling pattern, while the first cardioid pattern $C_1$ is the controlled pattern. The A.C. signal which generates the second cardioid pattern $C_2$ from the $C_2$ adder 36 defines the conducting period of the A.C. signal voltage from the $C_1$ adder 27. The gate 40 is enabled and has an output at terminal 43 when the voltage level of the A.C. signal output from the $C_1$ adder is greater than the voltage level of the A.C. signal output from the $C_2$ adder 36.

Referring to FIG. 3, the threshold gate 40 has a threshold level, as illustrated, which is slightly above the noise level of the ambient (sea) in which the acoustic apparatus 10 is disposed. Whenever the voltage level of the A.C. signal voltage of the $C_2$ adder 36 is below the threshold level of the threshold gate 40, the gate 40 is enabled and the A.C. signal from the $C_1$ adder 27 is passed through gate 40. Thus it can be seen in FIGS. 2 and 3, the gate 40 is enabled when the electrical output of the $C_1$ adder 27 is at a maximum and is not enabled when the A.C. signal output of the $C_1$ adder 27 is below a certain level, as defined by the limits established by the threshold gate 40.

Therefore, the acoustic apparatus 10 of the present invention provides an acoustic beam which is relatively narrow and controlled by the 180° phase shifted output voltage of the $C_2$ adder 36 through a threshold gate. The narrow beam may be expanded or compressed by adjusting the limits of the threshold gate 40.

Accordingly, the foregoing description should be taken merely as illustrative and not in any limiting sense.

What is claimed is:
1. An acoustic system for forming an acoustic beam comprising:
 (a) a hydrophone array including four hydrophones each supported at different corners of an imaginary square having diagonals the lengths of which are a fractional part of a given wavelength at a given operating frequency,
 (b) cardioid means connected to said hydrophone array for generating two output signals which respectively correspond to two cardioid patterns 180° out of phase with each other, and

(c) a threshold gating means connected to said cardioid means for deriving an output signal only when one of asid two output signals is at a greater voltage level than the other thereof.

2. The invention defined in claim 1 wherein said fractional part of a given wavelength is a quarter wavelength.

3. An acoustic system for forming an acoustic beam comprising:
(a) a hydrophone array including four hydrophones each supported at different corners of an imaginary square having diagonals the lengths of which are a fractional part of a given wavelength at a given operating frequency,
(b) cardioid means connected to said hydrophone array for generating two output signals which respectively correspond to two cardioid patterns 180° out of phase with each other,
(c) a threshold gating means connected to said cardioid means for deriving an output beam signal only when one of said two output signals is at a greater voltage level than the other thereof, and
(d) phase shifting means for selectively rotating said two cardioid patterns to thereby derive a rotatable beam pattern.

4. An acoustic system comprising:
(a) a hydrophone array including four hydrophones, each supported at different corners of an imaginary square having diagonals the lengths of which are fractional parts of a given wavelength at a given operating frequency,
(b) first and second signal combining means, each connected to a pair of said hydrophones which are disposed along each of said diagonals of said square to derive first and second electrical difference outputs respectively in response to acoustic energy applied thereto,
(c) a phase shifting resolver means, including an output terminal and a pair of input terminals connected to said first and second signal combining means for selectively deriving a phase shifted output at said output terminal,
(d) first adder means connected to each of said four hydrophones for deriving a reference signal when all of said hydrophones are excited by acoustic energy,
(e) second adder means connected between said first adder means and said output of said resolver means for deriving a first cardioid output signal voltage,
(f) third adder means including a 180° phase shifter connected between said first adder and said output terminal of said resolver for deriving a second cardioid output signal voltage which is 180° out of phase with said first cardioid output signal voltage, and
(g) threshold gating means connected to said second and third adder means for deriving an acoustic beam output signal only when the voltage level of said first cardioid output signal voltage exceeds the voltage level of said second cardioid output signal voltage.

References Cited by the Examiner
UNITED STATES PATENTS
2,987,700   6/1961   Hawkins _____ 340—6

RODNEY D. BENNETT, *Primary Examiner.*
R. A. FARLEY, *Assistant Examiner.*